United States Patent
Shao et al.

(10) Patent No.: US 11,861,912 B2
(45) Date of Patent: Jan. 2, 2024

(54) METHODS AND INTERNET OF THINGS SYSTEMS FOR COUNTING AND REGULATING PEDESTRIAN VOLUME IN PUBLIC PLACES OF SMART CITIES

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN); Yaqiang Quan, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/045,170

(22) Filed: Oct. 9, 2022

(65) Prior Publication Data
US 2023/0054003 A1 Feb. 23, 2023

(30) Foreign Application Priority Data
Jul. 26, 2022 (CN) .......................... 202210880906.1

(51) Int. Cl.
*G06V 20/52* (2022.01)
*G16Y 40/35* (2020.01)
*H04L 67/12* (2022.01)

(52) U.S. Cl.
CPC .............. *G06V 20/53* (2022.01); *G16Y 40/35* (2020.01); *H04L 67/12* (2013.01)

(58) Field of Classification Search
CPC ........ G06V 20/53; G16Y 40/35; H04L 67/12; G06F 16/2455; G06F 16/248
See application file for complete search history.

(56) References Cited

U.S. PATENT DOCUMENTS 11,109,194 B1 * 8/2021 Pinheiro ............... H04W 4/029
2013/0339290 A1 12/2013 Lee et al.
(Continued)

FOREIGN PATENT DOCUMENTS

| CN | 101697223 A | 4/2010 |
| CN | 107305573 A | 10/2017 |

(Continued)

OTHER PUBLICATIONS

The Second Office Action in Chinese Application No. 202210880906.1 dated Oct. 26, 2022, 23 pages.
(Continued)

*Primary Examiner* — Md K Talukder
(74) *Attorney, Agent, or Firm* — METIS IP LLC

(57) ABSTRACT

The present disclosure provide a method and an Internet of Things system for counting and regulating pedestrian volume in a public place of a smart city. The method includes receiving, based on the user platform, a query request for an intended place initiated by a user; transmitting, based on the service platform, the query request to the management platform, and generating, based on the management platform, a query instruction; issuing, based on the management platform, the query instruction to a corresponding sensor network sub-platform according to the regional location; sending, based on the sensor network sub-platform, the query instruction to the corresponding object platform; obtaining, based on the object platform, a query result according to the query instruction; and feeding back, based on the object platform, the query result to the user platform through the corresponding sensor network sub-platform, the management platform, and the service platform respectively.

6 Claims, 7 Drawing Sheets

(56) References Cited

U.S. PATENT DOCUMENTS

| | | | | |
|---|---|---|---|---|
| 2015/0294431 | A1* | 10/2015 | Fiorucci | G07B 15/02 705/13 |
| 2020/0117690 | A1* | 4/2020 | Tran | G06F 16/90332 |
| 2022/0126864 | A1* | 4/2022 | Moustafa | G05D 1/0061 |
| 2022/0335340 | A1* | 10/2022 | Moustafa | G06F 11/3003 |

FOREIGN PATENT DOCUMENTS

| | | |
|---|---|---|
| CN | 109474889 A | 3/2019 |
| CN | 110737832 A | 1/2020 |
| CN | 111144660 A | 5/2020 |
| CN | 112187497 A | 1/2021 |
| CN | 113159393 A | 7/2021 |
| CN | 113256163 A | 8/2021 |
| CN | 114390079 A | 4/2022 |
| CN | 114417190 A | 4/2022 |
| CN | 114629940 A | 6/2022 |
| CN | 114693495 A | 7/2022 |

OTHER PUBLICATIONS

Notification to Grant Patent Right for Invention in Chinese Application No. 202210880906.1 dated Nov. 3, 2022, 8 pages.

White Paper on Urban Brain Development, Smart City Standard Working Group of National Beacon Commission, 2022, 59 pages.

Dong, Jian, Research on Evolution of Social Networks Based on Link Prediction, Chinese Master's Theses Full-text Database Information Science and Technology, 2019, 77 pages.

Mohammad Ahsan et al., Influential Node Detection in Social Network During Community Detection, 2015 International Conference on Cognitive Computing and Information Processing(CCIP), 2015, 6 pages.

* cited by examiner

600

| | Edge AB | Edge AC | Edge BC | Edge BD | Edge CD | Edge DE | Edge EF | Edge EG | Edge EH | Edge FH | Edge FJ | Edge GJ | Edge HJ |
|---|---|---|---|---|---|---|---|---|---|---|---|---|---|
| EBC Value (A) | 4 | 4 | 0 | 3 | 3 | 5 | 4/3 | 4/3 | 4/3 | 0 | 1/3 | 1/3 | 1/3 |
| EBC Value (B) | 1 | 0 | 1 | 6 | 0 | 5 | 4/3 | 4/3 | 4/3 | 0 | 1/3 | 1/3 | 1/3 |
| EBC Value (C) | 0 | 1 | 1 | 0 | 6 | 5 | 4/3 | 4/3 | 4/3 | 0 | 1/3 | 1/3 | 1/3 |
| EBC Value (D) | 1/2 | 1/2 | 0 | 3/2 | 3/2 | 5 | 4/3 | 4/3 | 4/3 | 0 | 1/3 | 1/3 | 1/3 |
| EBC Value (E) | 1/2 | 1/2 | 0 | 3/2 | 3/2 | 4 | 4/3 | 4/3 | 4/3 | 0 | 1/3 | 1/3 | 1/3 |
| EBC Value (F) | 1/2 | 1/2 | 0 | 3/2 | 3/2 | 4 | 11/2 | 1/2 | 0 | 1 | 3/2 | 1/2 | 0 |
| EBC Value (G) | 1/2 | 1/2 | 0 | 3/2 | 3/2 | 4 | 1/2 | 6 | 1/2 | 0 | 1/2 | 2 | 1/2 |
| EBC Value (H) | 1/2 | 1/2 | 0 | 3/2 | 3/2 | 4 | 0 | 1/2 | 11/2 | 1 | 0 | 1/2 | 3/2 |
| EBC Value (J) | 1/2 | 1/2 | 0 | 3/2 | 3/2 | 4 | 5/3 | 5/3 | 5/3 | 0 | 8/3 | 8/3 | 8/3 |
| Total Value | 8 | 8 | 2 | 18 | 18 | 40 | 43/3 | 28/3 | 43/3 | 2 | 19/3 | 22/3 | 19/3 |

METHODS AND INTERNET OF THINGS SYSTEMS FOR COUNTING AND REGULATING PEDESTRIAN VOLUME IN PUBLIC PLACES OF SMART CITIES

CROSS-REFERENCE TO RELATED APPLICATIONS

This application claims priority of Chinese Patent Application No. 202210880906.1, filed on Jul. 26, 2022, the entire contents of which are hereby incorporated by reference.

TECHNICAL FIELD

The present disclosure relates to the field of the Internet of Things, and in particular, to a method and an Internet of Things system for counting and regulating pedestrian volume in a public place of a smart city.

BACKGROUND

With the continuous development of society and economy, the count of people traveling is also increasing day by day. In many cases, congestion occurs at different places on the street, which affects the smoothness of traffic and also affects the travel experience of users.

Therefore, it is desirable to provide a method and an Internet of Things system for counting and regulating pedestrian volume in a public place of a smart city, which can improve the efficiency of pedestrian volume management and control by using the Internet of Things and a cloud platform. At the same time, the method and the system can count the pedestrian volume in a place, and manage and regulate the pedestrian volume based on statistics, thereby helping users plan their trips reasonably, reducing street congestion, and improving user travel experience.

SUMMARY

Some embodiments of the present disclosure provide a method for counting and regulating pedestrian volume in a public place of a smart city, which is realized based on an Internet of Things system for counting and regulating pedestrian volume. The Internet of Things system for counting and regulating pedestrian volume may include a user platform, a service platform, a management platform, a sensor network platform, and an object platform. The method may include: receiving, based on the user platform, a query request for an intended place initiated by a user; transmitting, based on the service platform, the query request to the management platform, and generating, based on the management platform, a query instruction, wherein the query instruction includes a regional location of the intended place; issuing, based on the management platform, the query instruction to a sensor network sub-platform of the sensor network platform corresponding to the management platform according to the regional location, wherein the sensor network platform performs data storage, data processing, and/or data transmission for data of different object platforms by using different sensor network sub-platforms, and the different sensor network sub-platforms correspond to different regional locations; sending, based on the sensor network sub-platform, the query instruction to the object platform corresponding to the sensor network sub-platform; obtaining, based on the object platform, a query result according to the query instruction, wherein the query result includes current information of the intended place and recommendation information of a relevant place; and feeding back, based on the object platform, the query result to the user platform through the sensor network sub-platform, the management platform, and the service platform corresponding to the object platform respectively.

Some embodiments of the present disclosure provide an Internet of Things system for counting and regulating pedestrian volume in a public place of a smart city including a user platform, a service platform, a management platform, a sensor network platform, and an object platform. The user platform may be configured to receive a query request for an intended place initiated by a user. The service platform may be configured to transmit the query request to the management platform, and the management platform may be configured to generate a query instruction. The query instruction may include a regional location of the intended place. The management platform may be further configured to issue the query instruction to a sensor network sub-platform of the sensor network platform corresponding to the management platform according to the regional location. The sensor network platform may be configured to send the query instruction to the object platform corresponding to the sensor network platform. The sensor network platform may perform data storage, data processing, and/or data transmission for data of different object platforms by using different sensor network sub-platforms. The different sensor network sub-platforms may correspond to different regional locations. The object platform may be configured to obtain a query result according to the query instruction, and feed back the query result to the user platform through the sensor network sub-platform, the management platform, and the service platform corresponding to the object platform respectively. The query result may include current information of the intended place and recommendation information of a relevant place.

Some embodiments of the present disclosure provide a non-transitory computer-readable storage medium storing computer instructions. The computer instructions may be executed by a processor to perform the method for counting and regulating pedestrian volume in a public place of a smart city.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein:

FIG. 6 is a data table of a value of edge betweenness centrality and a total value of edge betweenness centrality according to some embodiments of the present disclosure.

DETAILED DESCRIPTION

Figure 1:
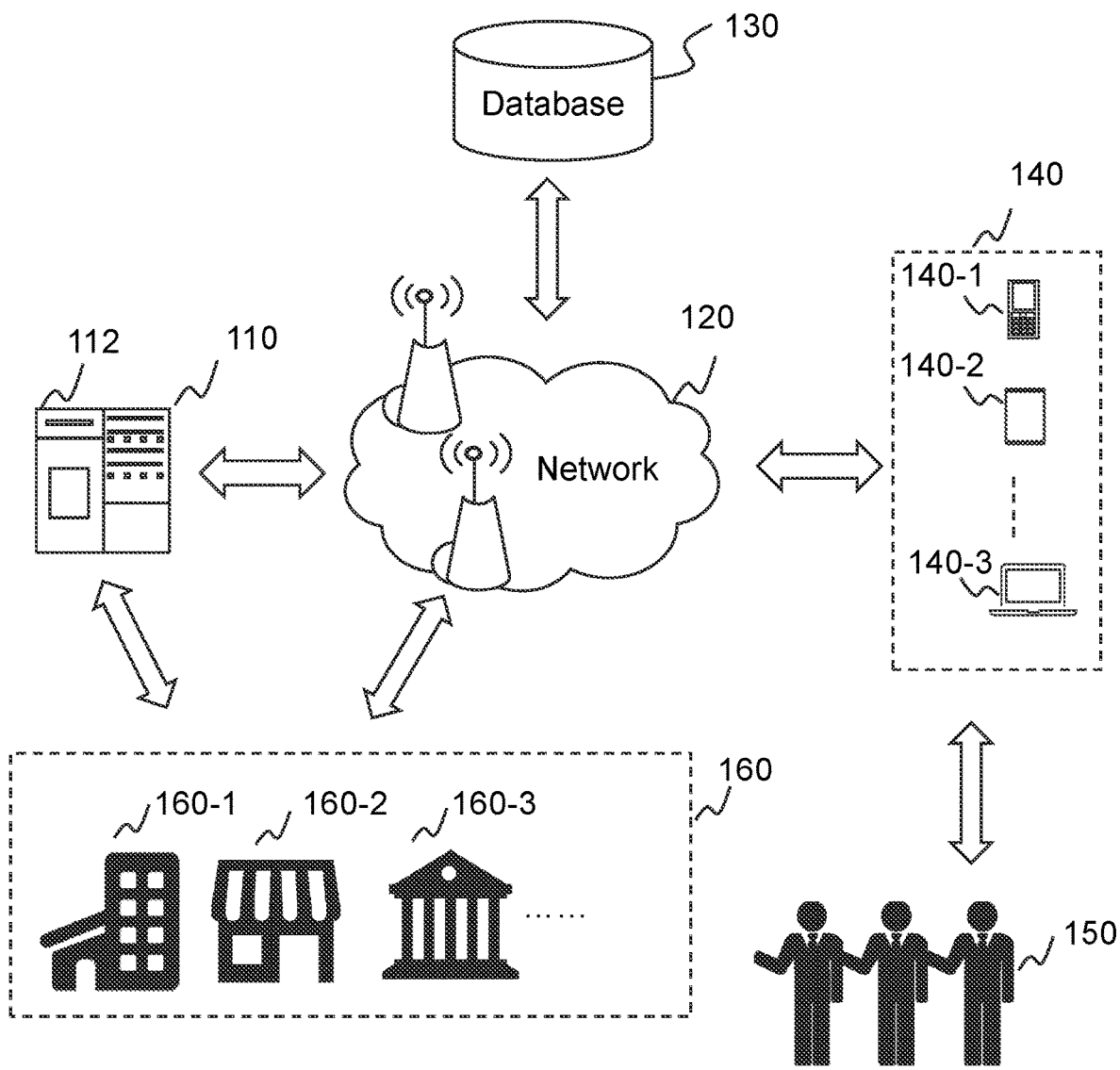
FIG. 1 is a schematic diagram illustrating an exemplary application scenario of an Internet of Things system for counting and regulating pedestrian volume in a public place of a smart city according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary application scenario of an Internet of Things system for counting and regulating pedestrian volume in a public place of a smart city according to some embodiments of the present disclosure.

An application scenario 100 may include a server 110, a network 120, a database 130, a terminal device 140, a user 150, and a place 160. The server 110 may include a processing device 112.

In some embodiments, the application scenario 100 of the Internet of Things system for counting and regulating pedestrian volume in a public place may obtain a query result for a query request of a user by implementing methods and/or processes disclosed in the present disclosure. For example, the processing device may receive, based on a user platform, the query request for an intended place initiated by the user, transmit, based on a service platform, the query request to a management platform, and generate, based on the management platform, a query instruction, issue, based on the management platform, the query instruction to a sensor network sub-platform of a sensor network platform corresponding to the management platform according to a regional location, send, based on the sensor network sub-platform, the query instruction to an object platform corresponding to the sensor network sub-platform, obtain, based on the object platform, a query result according to the query instruction, and feed back, based on the object platform, the query result to the user platform through the sensor network sub-platform, the management platform, and the service platform corresponding to the object platform respectively.

The server 110 may be connected to the terminal device 140 through the network 120. The server 110 may be connected to the database 130 through the network 120. The server 110 may be configured to manage resources and process data and/or information from at least one component of the system or an external data source (e.g., a cloud data center). In some embodiments, the query request for the intended place initiated by the user may be received through the server 110. The server 110 may obtain data in the database 130 or save the data to the database 130 during processing. In some embodiments, the server 110 may be a single server or a server group. In some embodiments, the server 110 may be local or remote. In some embodiments, the server 110 may be implemented on a cloud platform or provided in a virtual way.

In some embodiments, the server 110 may include a processing device 112. The processing device 112 may process data and/or information obtained from other devices or system components. The processor may execute program instructions based on the data, information, and/or processing results to perform one or more of functions described in the present disclosure. In some embodiments, the processing device 112 may include one or more sub-processing device (for example, a single-core processing device or a multi-core processing device). Merely by way of example, the processing device 112 may include a central processing unit (CPU), an application-specific integrated circuit (ASIC), or the like, or any combination thereof.

The network 120 may connect components of the application scenario 100 and/or connect the system to an external resource. The network 120 may enable communication between the components and with other components outside the system, facilitating exchange of data and/or information. In some embodiments, the network 120 may be a wired network, a wireless network, or any combination thereof. For example, the network 120 may include a cable network, an optical network, or the like, or any combination thereof. The network connection between components may be in one of above ways, or in various ways. In some embodiments, the network may include various topological structures, such as a point-to-point, a shared, a centralized topological structure, or the like, or any combination thereof. In some embodiments, the network 120 may include one or more network access points. In some embodiments, relevant data of the user 150 and the place 160 may be transmitted through the network 120.

The database 130 may be configured to store data and/or instructions. The database 130 may be directly connected to the server 110 or in an interior of the server 110. In some embodiments, the database 130 may be configured to store the relevant data of the user 150 and the place 160. The database 130 may be implemented in a single central server, a plurality of servers or a plurality of personal devices connected through a communication link. In some embodiments, the server 110, the terminal device 140, and other possible system components may include the database 130.

The terminal device 140 may refer to one or more terminal devices or software. In some embodiments, the terminal device 140 may serve as a user platform. For example, when a user of the terminal device is a tourist, the terminal device 140 may be used as a user platform to input a query request of the user. In some embodiments, the terminal device 140 may serve as a management platform. For example, when the user of the terminal device is a regulation agency of pedestrian volume, the terminal device 140 may be used as a management platform to summarize data to make a plan. In some embodiments, a user of the terminal device 140 may be one or more users. In some embodiments, the terminal device 140 may be other devices with input and/or functions, such as a mobile device 140-1, a tablet computer 140-2, a laptop computer 140-3, or the like, or any combination thereof. In some embodiments, the terminal device 140 and other possible system components may include the processing device 112.

The user 150 may be a user consumer of the user terminal 140, and the user may be a tourist, a visitor, a person regulating the pedestrian volume, or the like. In some embodiments, the user may issue a query request. For example, the user may query a location of a certain supermarket, locations of other supermarkets near a certain supermarket, a location of a retail department, etc. In some embodiments, the user may receive information fed back by the user terminal 140, such as receiving a query result, recommendation information, etc. In some embodiments, a count of users may be one or more.

The place 160 may be a specific location in a certain area. For example, the place may be any location such as an office building 160-1, a supermarket 160-2, an administrative building 160-3, a restaurant, a hairdresser, a station, a parking lot, or the like. In some embodiments, places may have a similarity in a function. For example, a shopping mall, a retail department, and a supermarket may belong to locations for shopping. A restaurant, a canteen, and a snack street may be locations for eating and drinking. Places may be classified according to differences and similarities of functions of the places. For example, types of the places may be classified into shopping, catering, attraction, medical care, etc.

It should be noted that the application scenario 100 is merely provided for the purpose of illustration, and not intended to limit the scope of the present disclosure. For those skilled in the art, multiple variations and modifications may be made to the processes under the teachings of the present disclosure. For example, the application scenario 100 may also include an information source. However, those variations and modifications do not depart from the scope of the present disclosure.

The Internet of Things system may be an information processing system that includes a user platform, a service platform, a management platform, a sensor network platform, or any combination thereof. The user platform may be a leader of the entire Internet of Things operation system, which may be used to obtain a user request. The user request may be is a foundation and premise of formation of the Internet of Things operation system. Connection between the platforms of the Internet of Things system may be to meet the user request. The service platform may be a bridge between the user platform and the management platform to realize connection between the user platform and the management platform. The service platform may provide an input and output service for a user. The management platform may realize overall planning and coordination of connection and cooperation between various functional platforms (such as the user platform, the service platform, the sensor network platform, and the object platform). The management platform may gather information of the Internet of Things operation system, and may provide functions of perception management and control management for the Internet of Things operation system. The sensor network platform may realize a function of connecting the management platform and the object platforms, and may play functions of perception information sensing communication and control information sensing communication. The object platform may be a functional platform for generating perception information and executing control information.

Information processing in the Internet of Things system may be divided into a processing process of the perception information and a processing process of the control information. The control information may be information generate based on the perception information. The processing of the perception information may be that the object platform obtains the perception information and transmits the perception information to the management platform through the sensor network platform. The management platform may transmit calculated perception information to the service platform, and finally to the user platform. The user may generate control information after judging and analyzing the perception information. The control information may be generated by the user platform and sent to the service platform. The service platform may transmit the control information to the management platform. The management platform may calculate the control information, and send the control information to the object platform through the sensor network platform, thereby controlling an object corresponding to the object platform.

In some embodiments, when applied to city management, the Internet of Things system may be called an Internet of Things system in a smart city.

Figure 2:
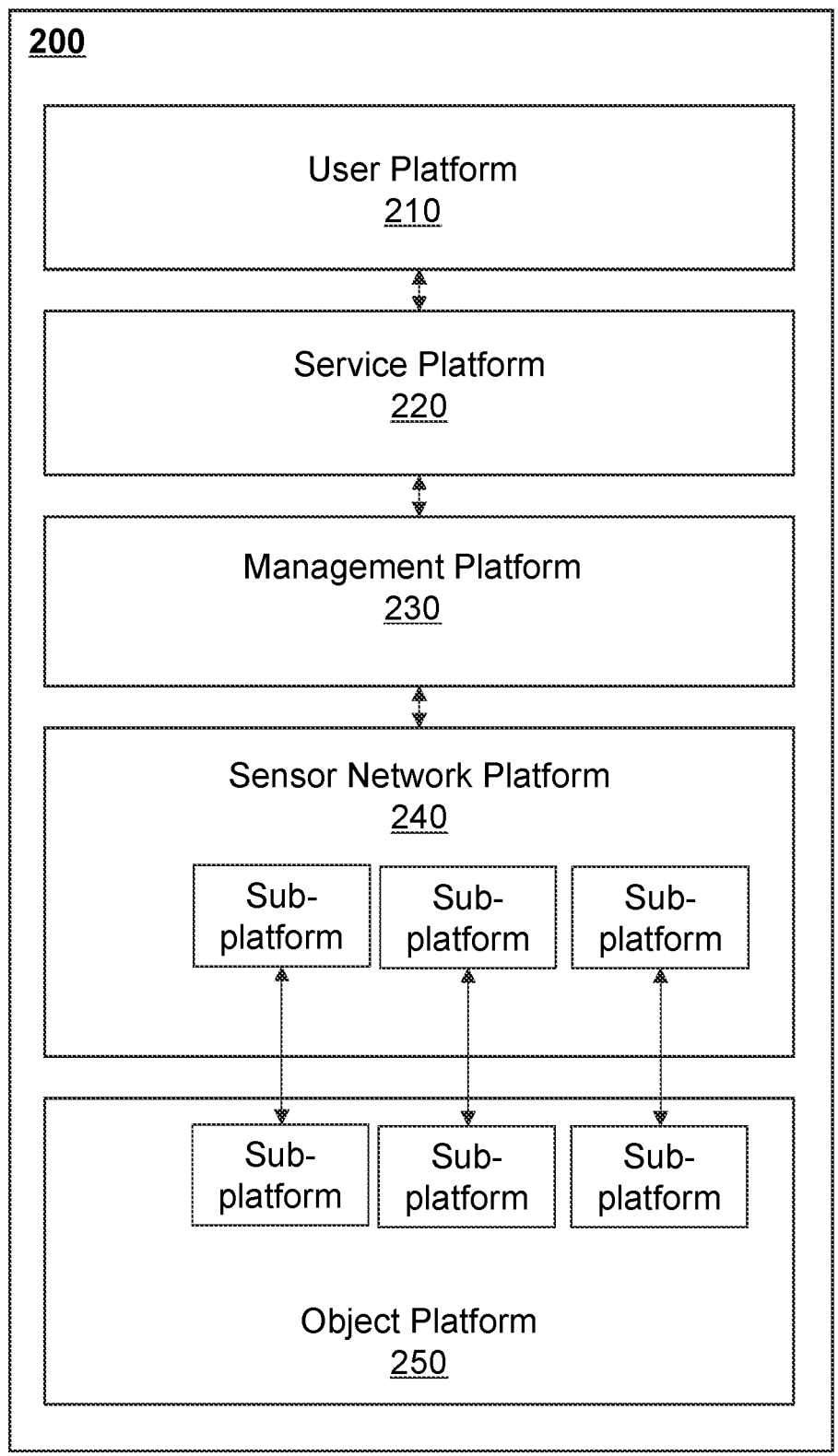
FIG. 2 is a block diagram illustrating an exemplary Internet of Things system for counting and regulating pedestrian volume in a public place of a smart city according to some embodiments of the present disclosure.

FIG. 2 is a block diagram illustrating an exemplary Internet of Things system for counting and regulating pedestrian volume in a public place of a smart city according to some embodiments of the present disclosure.

As shown in FIG. 2, an Internet of Things system 200 for counting and regulating pedestrian volume in a public place of a smart city may include a user platform 210, a service platform 220, a management platform 230, a sensor network platform 240, and an object platform 250. In some embodiments, the Internet of Things system 200 for counting and regulating pedestrian volume in a public place may be a part of the server 110 or implemented by the server 110.

In some embodiments, the Internet of Things 200 system for counting and regulating pedestrian volume in a public place of a smart city may be applied to various scenarios of pedestrian volume counting and regulation. In some embodiments, the Internet of Things system 200 for counting and regulating pedestrian volume in a public place may obtain a query instruction based on a query request for an intended place initiated by a user and obtain a query result according to the query instruction. In some embodiments, the Internet of Things system 200 for counting and regulating pedestrian volume in a public place of a smart city may determine a management and control strategy for the intended place based on the query request for the intended place and current information of the intended place.

Various scenarios of counting and regulation pedestrian volume in a public place may include, for example, a pedestrian volume monitoring in a place scenario, a municipal construction planning scenario, an urban population distribution prediction scenario, etc. It should be noted that the above scenarios are merely examples, which do not limit the application scenarios of the Internet of Things system 200 for counting and regulating pedestrian volume in a public place of a smart city. Those skilled in the art may apply the Internet of Things system 200 for counting and regulating pedestrian volume in a public place of a smart city to any other appropriate scenarios on the basis of the content disclosed in the embodiment.

In some embodiments, the Internet of Things system 200 for counting and regulating pedestrian volume in a public place of a smart city may be applied to the pedestrian volume monitoring in a place. When the Internet of Things system 200 is applied to the pedestrian volume monitoring in a place, the object platform may be configured to collect a query request for the intended place and current information of the intended place, and determine a management and control strategy for the intended place based on the above information.

In some embodiments, the Internet of Things system 200 for counting and regulating pedestrian volume in a public place of a smart city may be applied to the municipal construction planning. For example, a user demand for the place in an area corresponding to the place based on the pedestrian volume in the place and a management and control strategy corresponding to the pedestrian volume. It may be determined whether a new relevant place is built nearby based on the user demand.

In some embodiments, the Internet of Things system 200 for counting and regulating pedestrian volume in a public place of a smart city may be applied to the urban population distribution prediction. For example, the user platform may receive the query request for the intended place initiated by the user. The service platform may transmit the query request to the management platform and generate a query instruction based on the management platform. The query instruction may be issued, based on the management platform, to a sensor network sub-platform of the sensor network platform corresponding to the management platform according to the regional location. The query instruction may be sent, based on the sensor network sub-platform, to the object platform corresponding to the sensor network sub-platform. The query instruction may be counted based on the object platform and population distribution may be obtained.

Taking the Internet of Things system 200 for counting and regulating pedestrian volume in a public place of a smart city applied to the pedestrian volume monitoring in a place scenario as an example, details of Internet of Things system 200 for counting and regulating pedestrian volume in a public place is specifically illustrated as follows.

The user platform 210 may be a user-oriented service interface. In some embodiments, the user platform 210 may receive a query request for an intended place initiated by a user. In some embodiments, the user platform 210 may be configured to feed back a query result to the user. In some embodiments, the user platform 210 may send the query request to the service platform. In some embodiments, the user platform 210 may receive a management and control strategy, the query result, etc. sent by the service platform.

The service platform 220 may be a platform for preliminary processing of the query request. In some embodiments, the service platform 220 may transmit the query request to the management platform, and generate a query instruction based on the management platform. The query instruction may include a regional location of the intended place. In some embodiments, the service platform 220 may receive the management and control strategy, the query result, etc. sent by the management platform.

The management platform 230 may refer to an Internet of Things platform that overall plans and coordinates the connection and cooperation between various functional platforms, and provides perception management and control management.

In some embodiments, the management platform may generate the query instruction. In some embodiments, the management platform 230 may issue the query instruction to a sensor network sub-platform of the sensor network platform corresponding to the management platform according to the regional location. In some embodiments, the management platform 230 may receive the query request sent by the service platform.

The sensor network platform 240 may be a platform that realizes an interaction between the management platform and the object platform. In some embodiments, the sensor network platform 240 may receive the query instruction sent by the management platform. In some embodiments, the sensor network platform 240 may send the query instruction to the object platform corresponding to the sensor network platform. In some embodiments, the sensor network platform 240 may be configured as an independent structure. The independent structure may refer to that the sensor network platform may perform data storage, data processing, and/or data transmission for data of different object platforms by using different sensor network sub-platforms. For example, each sensor network sub-platform may be in one-to-one correspondence with an object sub-platform of each object platform. The sensor network platform 240 may obtain query requests for intended places and relevant places uploaded by each object sub-platform, and upload the query requests to the management platform.

The object platform 250 may be a functional platform for generating perception information and executing control information. The object platform 250 may be configured to obtain a query result according to the query instruction. The query result may include current information of the intended place and recommendation information of the relevant place. In some embodiments, the object platform 250 may also feed back the query result to the user platform through the sensor network platform, the management platform, and the service platform corresponding to the object platform, respectively.

In some embodiments, the object platform 250 may be configured to include a plurality of object sub-platforms, and different object sub-platforms may obtain information of places in different areas correspondingly. For example, the object platform 250 may upload the query requests for the intended place and the relevant place to each sensor network platform corresponding to the object platform.

In some embodiments, the object platform 250 may be further configured to obtain information of the intended places and the relevant place in a regional place map and generate the query result according to the query requests. Different nodes in the regional place map may represent different places. Attributes of the nodes in the regional place map may include place real-time information and place basic information. An edge in the regional place map may be configured to connect two nodes, a mutual relationship of which meets a preset condition.

In some embodiments, the object platform 250 may be further configured to divide, based on a preset algorithm, the regional place map into several sub-maps; determine, based on the query request, a target sub-map from the several sub-maps; and determine, based on the target sub-map, a recommendation node, and determine a place corresponding to the recommendation node as the relevant place.

In some embodiments, the object platform 250 may be further configured to determine a management and control strategy for the intended place based on the query request for the intended place and the current information of the intended place.

In some embodiments, the object platform 250 may be further configured to determine, based on a current flow of the intended place and a count of users querying, a flow management and control strategy of the intended place.

In some embodiments, the object platform 250 may be further configured to predict a flow of the intended place at a future time. When the flow at the future time is greater than a preset threshold, flow management and control may be performed in the intended place.

In some embodiments, the object platform 250 may be further configured to determine, based on the count of users querying the intended place, popularity of the intended place; and adjust, based on the popularity, the current flow of the intended place to determine a flow at the future time.

Detailed descriptions regarding the object platform 250 may be found in FIG. 4-FIG. 7 and relevant descriptions.

It will be understood that for those skilled in the art, after understanding the principle of the system, it is possible to apply the Internet of Things system 200 for counting and regulating pedestrian volume in a public place of a smart city to any other appropriate scenario without departing from this principle.

It should be noted that the above description of the system and its components is merely provided for the purposes of illustration, and not intended to limit the scope of the present disclosure. It will be understood that for those skilled in the art, after understanding the principle of the system, it is possible to arbitrarily combine various components, or form subsystems to connect with other components without departing from this principle. For example, each component may share a storage device. Each component may have its own storage device. Those variations are still within the scope of the present disclosure.

Figure 3:
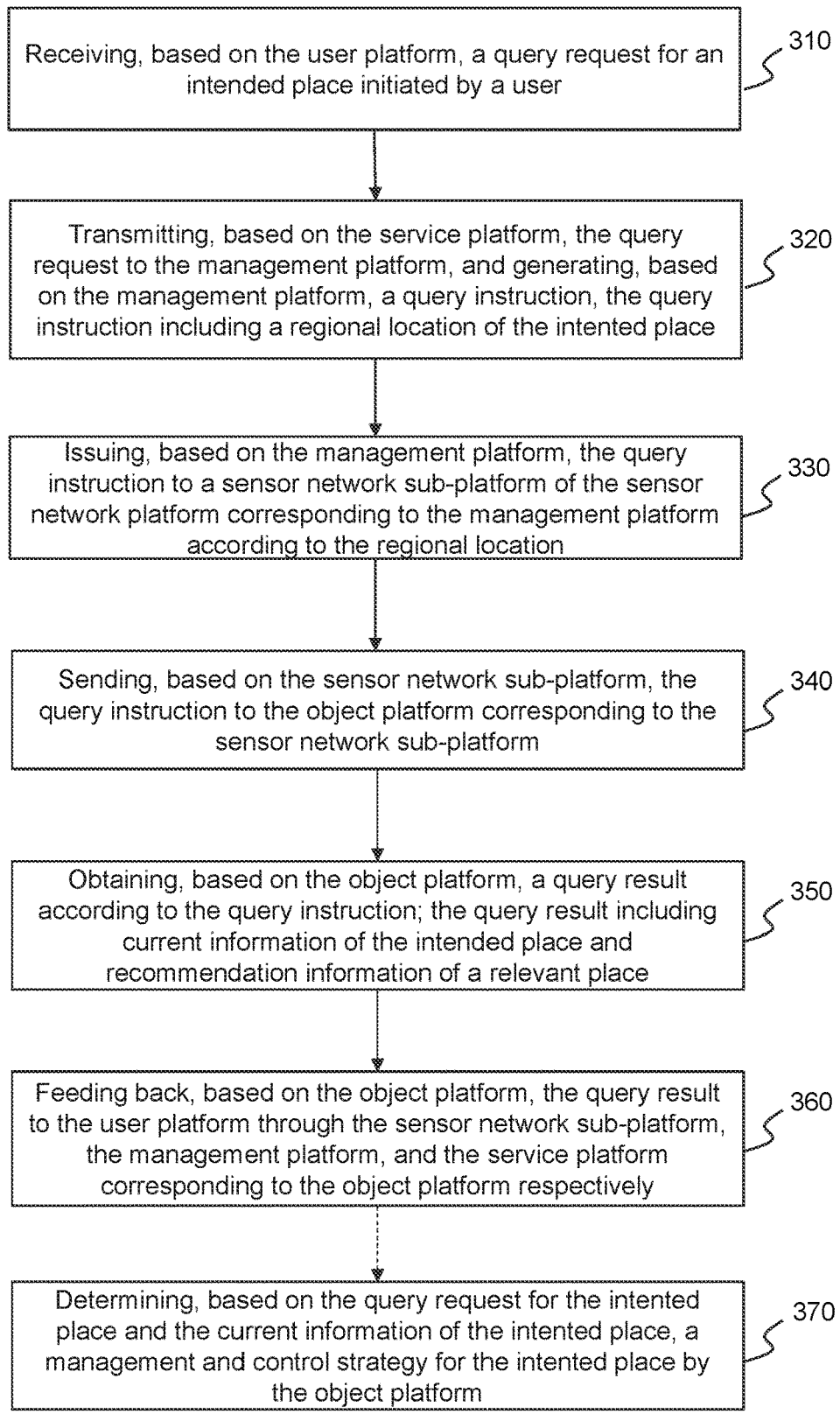
FIG. 3 is a flowchart illustrating an exemplary process for counting and regulating pedestrian volume in a public place of a smart city according to some embodiments of the present disclosure.

FIG. 3 is a flowchart illustrating an exemplary process for counting and regulating pedestrian volume in a public place of a smart city according to some embodiments of the present disclosure. As shown in FIG. 3, in some embodiments, the process 300 may be performed by a processing device.

In 310, a query request for an intended place initiated by a user may be received based on a user platform.

The intended place may be a place that a user intends to go to. For example, the intended place may be places, such as a shopping mall, a restaurant, a school, an administrative center, an office building, or the like. In some embodiments, the intended may be a place input by the user on a user terminal, for example, the user may input a specific restaurant name, etc. on the mobile phone.

A query request may be content that the user searches for relevant information of the intended place. For example, the query request may include query content such as a location, a function, whether is controlled or not, information of pedestrian volume, etc. of the intended place. In some embodiments, if the query request is obtained by input of the user on the user terminal, the user terminal may be used as a user platform to obtain the query request.

In 320, the query request may be transmitted, based on a service platform, to a management platform, a query instruction may be generated based on the management platform, and the query instruction may include a regional location of the intended place.

The query instruction may be information extracted from the query request that may be identified by a system. For example, the query instruction may include information such as a regional location, a query time, a query method, etc. of the intended place.

The regional location may be information that reflects a geographical location of the intended place. For example, the regional location may be a latitude and a longitude, a coordinate, a relative distance from a current location of the user, etc.

In some embodiments, the query request received from the user platform may be sent to the management platform for preliminary processing through the service platform to form a query instruction that may be identified by the system. For example, the query instruction may be a matrix, a data table, etc. composed of information such as the regional location, the query time, the query method, etc. of the intended place.

In 330, the query instruction may be issued, based on the management platform, to a sensor network sub-platform of the sensor network platform corresponding to the management platform according to the regional location.

In some embodiments, the sensor network platform may include a plurality of sensor network sub-platforms, and different sensor network sub-platforms may be configured to receive query instructions of different regional locations issued by the management platform. The sensor network platform may perform data storage, data processing, and/or data transmission for data of different object platforms by using the sub-platforms of different sensor network platforms. Different sensor network sub-platforms may correspond to different regional locations.

In 340, the query instruction may be sent, based on the sensor network sub-platform, to the object platform corresponding to the sensor network sub-platform.

In some embodiments, the object platform may include a plurality of object sub-platforms, and different object sub-platforms may correspond to different regional locations. For example, if different object sub-platforms are set in different regional locations, the sensor network sub-platform and the object sub-platform corresponding to a same regional position may have a corresponding relationship. The sensor network sub-platform may send the query instruction to an object sub-platform corresponding the sensor network sub-platform.

In 350, a query result may be obtained based on the object platform according to the query instruction, and the query result may include current information of the intended place and recommendation information of a relevant place.

The query result may be information related to the intended place. For example, the query result may include current information of the intended place and recommendation information of a relevant place.

The current information may be real-time information of the intended place. For example, the current information may include information on real-time pedestrian volume of the intended place, information on whether the intended place is currently under control (access restriction), information on restrictions on roads around the intended place, or the like.

The relevant place may be a place with similar features to the intended place. For example, the relevant place may be a place with similar functions. If the intended place is a shopping mall, the relevant place may be a pedestrian street, a supermarket, etc. If the intended place is a hospital, the relevant place may be an outpatient department, a pharmacy, or the like. As another example, the relevant place may be a place where there is a similar regional location. If the intended place is a certain parking lot, the relevant place may be other parking lots nearby. In some embodiments, a spatial distance between the relevant place and the intended place may be within a preset range.

The recommendation information may be information that the relevant place is recommended to the user. For example, the recommendation information may be information in forms such as text, voice, an image, or the like, or any combination thereof.

In some embodiments, the query result may be further determined in ways such as based on a sensor, manual input, a preset rule, or the like. For example, the object platform may obtain information on real-time pedestrian volume as the query result through a pedestrian volume monitoring sensor. As another example, the object platform may use response of an artificial customer service to the query request as the query result. As yet another example, the object platform may determine the query result by comparing regional locations of each place and the intended place, and the object platform may determine the query result by classifying the places based on function, or the like. For example, by comparing a coordinate, a longitude and a latitude, etc., the relevant place of the intended place may be determined, or the relevant place related to the function of the intended place may be determined through a preset place function classification table.

In 360, the query result may be fed back, based on the object platform, to the user platform through the sensor network sub-platform, the management platform, and the service platform corresponding to the object platform respectively.

The process of feeding back the query result from the object platform to the user platform is an inverse process of the above transmission process of the user request and the query instruction, which will not be repeated herein.

In some embodiments, the process 300 may also include an operation 370 that the object platform determines, based on the query request for the intended place and the current information of the intended place, a management and control strategy for the intended place.

The number of the operation 370 is merely for convenience of description, and does not mean that the sequence of the operations is limited. For example, the operation 370 may be performed between the operation 350 and the operation 360. In some embodiments, the operation 370 in the process 300 may be optional, that is, the operation 370 may not be included.

The management and control strategy may be a plan to limit the pedestrian volume, limit the movement, and limit the access for the intended place. For example, the management and control strategy may include information such as a control time range, a control space range, a control operator arrangement, a pedestrian volume diversion planning, etc.

In some embodiments, the management and control strategy may be determined based on a preset of system. For example, when the current pedestrian volume of the intended place exceeds a threshold of pedestrian volume preset by the system, the management and control strategy may be determined to be measures such as limiting the pedestrian volume and diverting the pedestrian volume. The object platform may obtain the management and control strategy generated by the system based on a sensor network sub-platform corresponding to the object platform.

In some embodiments, the management and control strategy may be determined based on a user setting. For example, the user may make specific settings for the management and control strategies such as a road construction, an epidemic, etc. based on situations of emergencies. The object platform may obtain the management and control strategy manually input based on the sensing network sub-platform corresponding to the object platform. Further descriptions regarding the determining the management and control strategy of the intended place may be found in FIG. 7 and relevant descriptions.

Through the method for counting and regulating pedestrian volume in a public place described in some embodiments of the present disclosure, a relevant place and a management and control strategy recommended to the user can be realized based on a situation of current pedestrian volume in a certain place. Through the intelligent recommendation based on pedestrian volume, on the premise of preventing the user from going to a place with high pedestrian volume, the request of the user may be met as much as possible, which can improve the user experience.

It should be noted that the descriptions of the above process 300 is merely provided for the purposes of illustration, and not intended to limit the scope of the present disclosure. For those skilled in the art, multiple variations and modifications may be made to the process 300 under the teachings of the present disclosure. However, those variations and modifications do not depart from the scope of the present disclosure. For example, the process 300 may also include a preprocessing operation.

Figure 4:
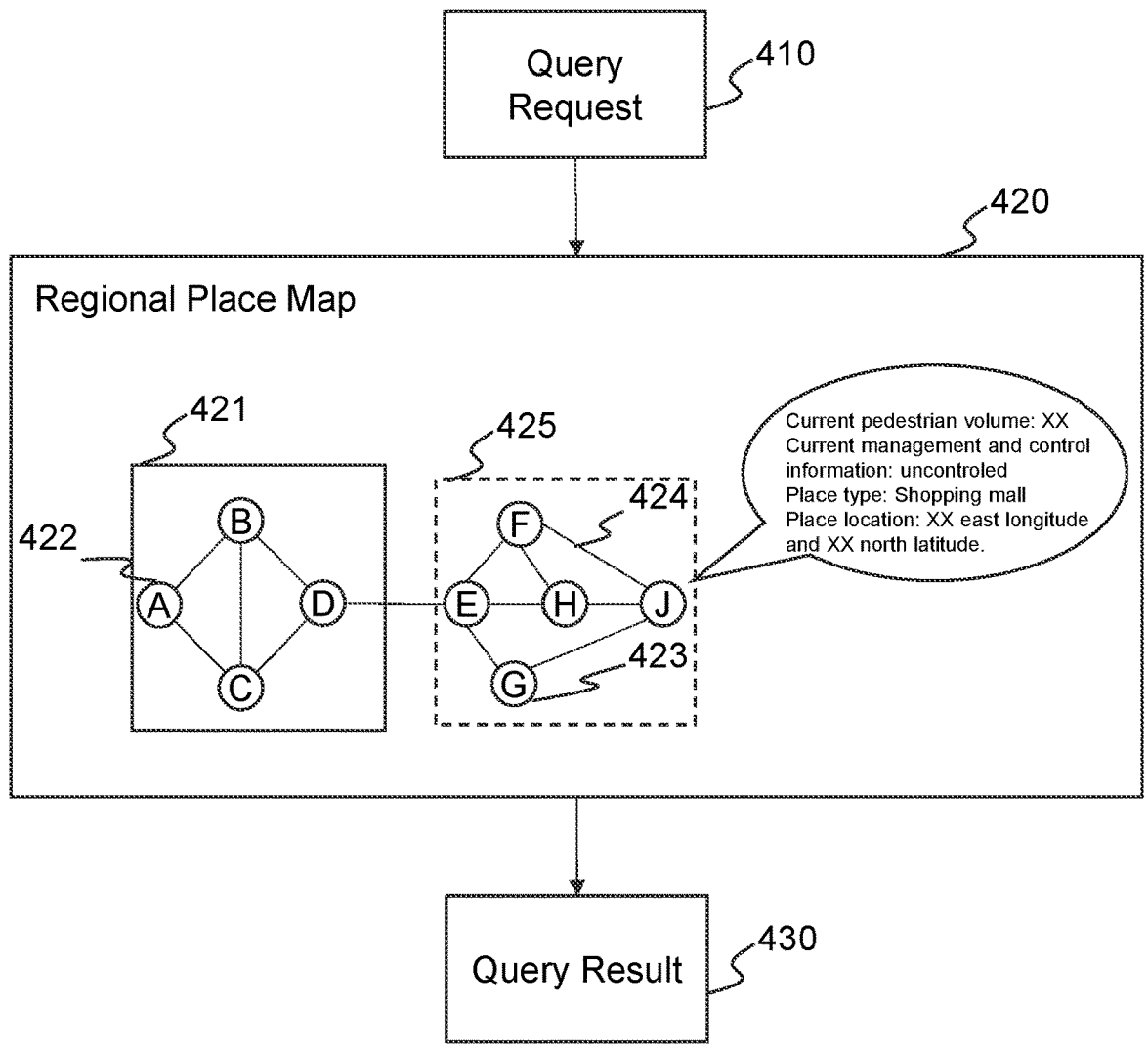
FIG. 4 is a schematic diagram illustrating an exemplary process for determining a relevant place according to some embodiments of the present disclosure.

FIG. 4 is a schematic diagram illustrating an exemplary process for determining a relevant place according to some embodiments of the present disclosure.

As shown in FIG. 4, a relevant place in a query result may be determined through the following process 400. Based on an object platform, information of the intended place and the relevant place in a regional place map 420 may be obtained according to a query request 410, and a query result 430 may be generated.

In some embodiments, the query request may include an intended place. The object platform may extract information related to the intended place in the query request, and find a node corresponding to the intended place in the regional place map. For example, the query request of the user may include information such as a name, a position coordinate, a function type, etc. of the intended place. Based on the above information, the object platform may find the node corresponding to the intended place related to the above information in the regional place map.

In some embodiments, the object platform may determine a node corresponding to the relevant place based on the node corresponding to the intended place. In some embodiments, the object platform may determine the node corresponding to the relevant place based on attributes of the node corresponding to the intended place. For example, the node corresponding to the relevant place may be determined based on a place location, a place type, etc. of the node corresponding to the intended place. In some embodiments, the relevant place (the corresponding node) may be determined through the operations of S1 to S3.

In some embodiments, the object platform may generate the query result. For example, the object platform may input the attributes of the nodes corresponding to the intended place and the relevant place into a preset table of query results as the query result.

The regional place map 420 may represent mutual relationship among all places and features of each place included in a certain region. A regional size may be set according to the query request of the user, for example, a region may be a city, a district/county, a township, etc. The place in the regional map may be represented based on the node in the regional place map. The features of the place may be obtained based on the attributes of the node. The mutual relationship between the places may be obtained based on edges in the regional place map. In some embodiments, the regional place map may be further obtained by importing existing map data as basic data and based on manual marking, or the like.

The regional place map may include a plurality of nodes, and different nodes in the regional place map may represent different places. For example, node 1 may represent a certain parking lot in the regional place map, node 2 may represent a certain hotel in the regional place map.

In some embodiments, each node may include the attributes of the node. The attributes of the node may be parameters of the node. For example, the attributes of the node may include place real-time information, place basic information, etc. of the place corresponding to the node.

The place real-time information may be information that dynamically changes according to a real-time situation of the place. For example, the place real-time information may include current pedestrian volume, current management and control information, or any combination thereof.

The current pedestrian volume may be passenger flow volume in the place at a current time or within a certain time period close to the current time. In some embodiments, the current pedestrian volume may be detected by a sensor installed in a place or a relevant road section.

The current management and control information may be management information of the pedestrian volume in the place at a current time or within a certain time period close to the current time. For example, the current management and control information may include information such as limiting, diverting, complete opening, etc. of pedestrian volume. In some embodiments, the current management and control information may be input by a user or obtained through a network.

The place basic information may be relatively fixed information that does not change over time. For example, the place basic information may include a place type (that is, a place function), a place location (such as a coordinate or a latitude and a longitude), or any combination thereof.

The place type may be a function type of the place. For example, the place type may include a type such as catering, shopping, school, accommodation, medical care, etc. The place location may be a geographical location to which the place specifically relates. For example, the place location may be information, such as a latitude, a longitude, a coordinate, etc. where the place is located.

An edge 424 in the regional place map may be configured to connect two nodes, a mutual relationship of which meets a preset condition. Attributes of the edge may represent a relationship between different nodes in the regional place map. The attributes of the edge may include an edge weight. The edge weight may reflect a correlation between two nodes to be connected or connected. For example, the edge weight may be 1, 2, 10, etc. The larger the edge weight is, the weaker the correlation between the two nodes is.

In some embodiments, the preset condition that needs to be met between the two connected nodes may be related to the edge weight between the two nodes. For example, the preset condition may be that the edge weight is lower than or equal to a preset threshold, or the like.

In some embodiments, the edge weight may be determined by a place type difference and a spatial distance of places corresponding to two connected nodes.

The place type difference may be a type difference of places corresponding to two nodes. In some embodiments, the place type difference may be represented by a place type difference value within a range of 0 to 5. The larger the place type difference value is, the greater the function type between two places is. For example, the place type difference value between different shopping malls may be 0. The place type difference value of a shopping mall and a retail department may be 1. The place type difference value of a shopping mall and a parking lot may be 5, or the like.

The spatial distance may be a straight line distance between places. In some embodiments, the spatial distance may be represented by a spatial score within a range of 0 to 5. The larger the spatial score is, the closer a distance between two places is. For example, for two places with a spatial distance ranging from 0 to 200 meters, the spatial score may be 5. For two places with a spatial distance of more than 2000 meters, the spatial score may be 1.

In some embodiments, an edge weight of an edge between two nodes may be calculated through a place type difference value and a spatial score. For example, an edge weight of two nodes A and B may be calculated through the following equation (1):

$$Q_{AB}=10-(X_{AB}-D_{AB}) \tag{1}$$

where $Q_{AB}$ denotes an edge weight between the two nodes A and B, $X_{AB}$ denotes a spatial score between the node A and the node B, and $D_{AB}$ denotes a place type difference value between the node A and the node B.

In some embodiments, the spatial score and the place type difference value may be weighted for calculation, that is, the edge weight of an edge between two nodes may be weighted calculation values of the spatial score and the place type difference value of the two nodes. For example, the edge weight of the edge between the two nodes A and B may be calculated through the following equation (2):

$$Q_{AB}=10-(m_1 X_{AB}-m_2 D_{AB}) \tag{2}$$

where $m_1$ denotes a weight of the spatial score, $m_2$ denotes a weight of the place type difference value, and $m_1+m_2=1$.

In some embodiments, the weight of the spatial score and the weight of the place type difference value may be determined by manual setting, for example, which are determined by a query request of a user.

In some embodiments, the preset condition that is met between two connected nodes may be that a place type difference of places corresponding to the two connected nodes is smaller than a preset difference value, or a spatial distance of places corresponding to the two connected nodes is less than a distance threshold.

Merely by way of example, the preset conditions may be that a place type difference value of the places corresponding to the two connected nodes is less than 2, or the spatial distance of places corresponding to the two connected nodes is less than 200 m, or the spatial score is greater than 4.

In some embodiments, the relevant place may be determined through the following process. Candidate places may be determined based on degree of association and an edge weight. The relevant place may be determined, based on a query request, from the candidate places.

The degree of association may be degree of similarity and correlation between nodes. For example, the degree of association may be degree of correlation between node locations (i.e., place locations) and node types (i.e., place types). In some embodiments, the degree of association may be divided into different levels. For example, the degree of association may include different levels such as a primary association, a secondary association, etc. The primary association may be a level of the degree of association with a highest degree of similarity and correlation between nodes. The secondary correlation may be a level of the degree of association with a relatively high degree of similarity and correlation between nodes. For example, as shown in FIG. 4, the node A and the node B are connected by only one edge, and the two nodes may be a primary association. The node A and the node D are connected by at least two edges, and the two nodes may be a secondary association, or the like.

The candidate place may be a place with the degree of association and the edge weight meet a preset condition. For example, the preset condition may be that the degree of association between the candidate place and the intended place is a primary association or a secondary association, and the edge weight corresponding to the edge between the candidate place and the intended place is less than or equal to 4.

In some embodiments, the relevant place (i.e., the corresponding node) may also be determined through the following operations.

In S1, the regional place map may be divided, based on a preset algorithm, into several sub-maps.

The preset algorithm may be the algorithm for dividing the regional place map according to certain rules. Based on the preset algorithm, each node in the regional place map may be clustered and divided based on certain features. Detailed descriptions regarding the preset algorithm may be found in FIG. 5 and relevant descriptions thereof.

The sub-map may be a sub-map formed by nodes with similar features and edges between the nodes in the regional place map. For example, the sub-map may be a set of a certain part of nodes and edges in the regional place map. The sub-map may include at least one node. For example, based on the preset algorithm, the regional place map 420 in FIG. 4 may be divided into two sub-maps, for example, such as a sub-map 421 and a sub-map 425.

In S2, the target sub-map may be determined, based on the query request, from the several sub-maps.

The target sub-map may be a sub-map that contains an intended place. In some embodiments, the target sub-map may include a target node (i.e., an intended place). In some embodiments, the object platform may designate the sub-map where the intended place is located as the target sub-map. For example, if the target node in FIG. 4 is a node 422, the sub-map 421 may be determined as the target sub-map.

In S3, a recommendation node may be determined based on the target sub-map, and a place corresponding to the recommendation node may be determined as the relevant place.

A recommended node 423 may be a node that meets a preset requirement, for example, a node that is similar to the target node 422. In some embodiments, one or more nodes in a same sub-map as the target node (such as a node in the target sub-map 421 in FIG. 4) may be used as recommendation nodes.

Through the regional place map described in the some embodiments of the present disclosure, the visual processing of the place function and the place location can be realized, which is convenient for the judgment of the relevant place.

In addition, the candidate place may be determined by the degree of association and the edge weight between the nodes corresponding to the place, which improves the accuracy of the judgment process.

Figure 5:
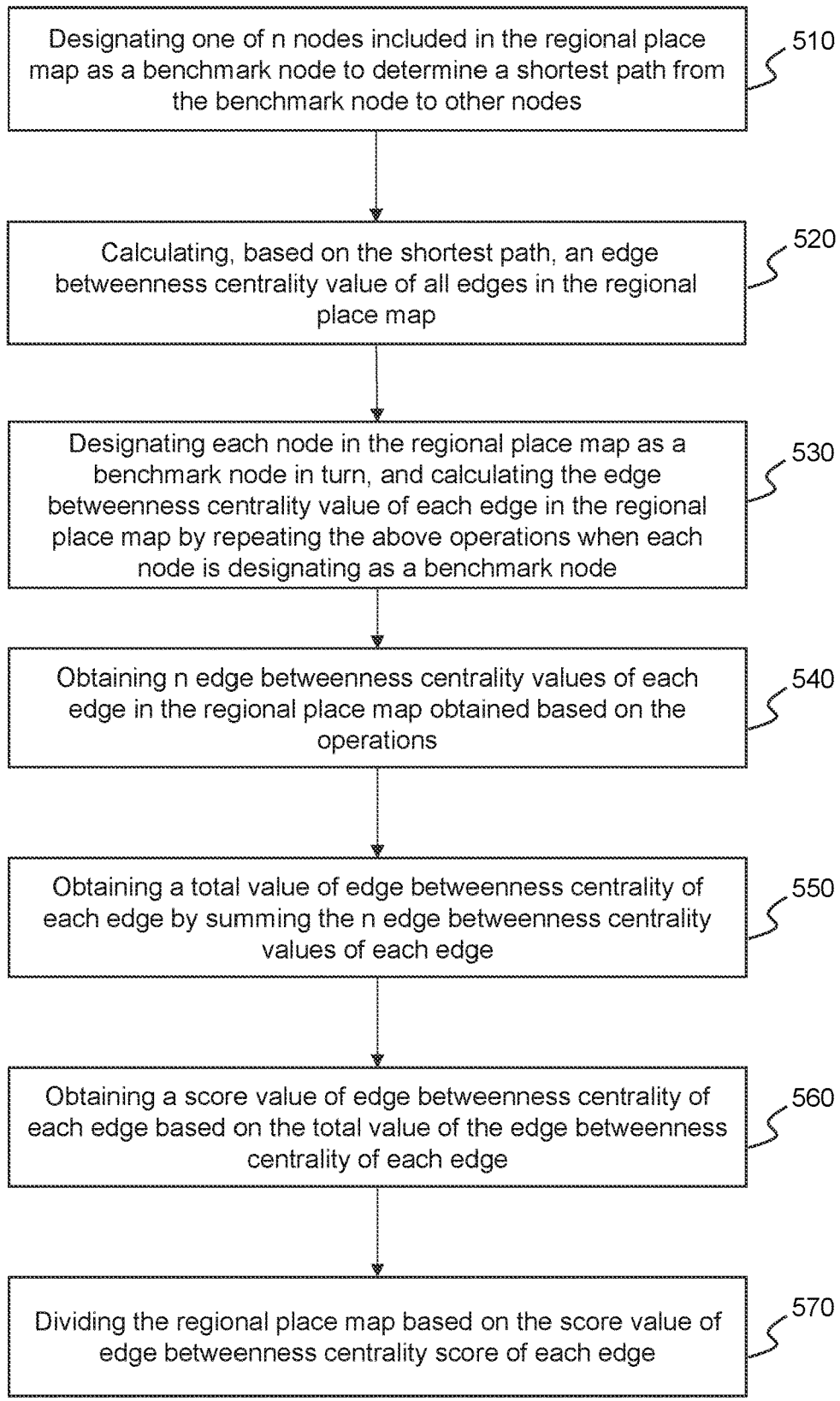
FIG. 5 is a schematic diagram illustrating a preset algorithm according to some embodiments of the present disclosure.

FIG. 5 is a schematic diagram illustrating a preset algorithm according to some embodiments of the present disclosure. In some embodiments, the process 500 may be performed by an object platform.

In 510, one of n nodes included in the regional place map may be designated as a benchmark node to determine a shortest path from the benchmark node to other nodes.

The benchmark node may be any node of all the nodes included in the regional place map. In some embodiments, in a division of the regional place map, each node (n) in the regional place map may be calculated as a benchmark node, respectively.

The shortest path may be a shortest edge connecting the benchmark node to other nodes through edges. For example, in FIG. 4, when a node A is the benchmark node, a shortest path from A to B may be an edge AB. A shortest path from A to C may be an edge AC. A shortest path from A to D may be an edge ABD (i.e., an edge AB+an edge BD) or an edge ACD (i.e., an edge AC+an edge CD). A shortest path from A to E may be an edge ABDE or an edge ACDE. A shortest path from A to F may be an edge ABDEF or an edge ACDEF. A shortest path from A to G may be an edge ABDEG or an edge ACDEG. A shortest path from A to H may be an edge ABDEH or an edge ACDEH. A shortest path from A to J may be an edge ABDEFJ, an edge ACDEFJ, an edge ABDEGJ, an edge ACDEGJ, an edge ABDEHJ, or an edge ACDEHJ. For a shortest path when another node is used as the benchmark node, please refer to the shortest path when the node A is the benchmark node.

In 520, based on the shortest path, an edge betweenness centrality value of all edges in the regional place map may be calculated.

The edge betweenness centrality value (EBC value) may be a parameter representing a proportion of a count of shortest paths passing through a certain edge in the shortest paths from the benchmark node to other nodes with a certain node as a benchmark node in the regional place map.

For example, when the node A is the benchmark node, the edge betweenness centrality value of the edge AB may be: in shortest paths from the node A to other nodes (X), a sum of a proportion of paths passing through the edge AB in all paths from node A to other nodes X. For example, from the node A to the node J, there are six paths of ABDEFJ, ACDEFJ, ABDEGJ, ACDEGJ, ABDEHJ, and ACDEHJ. The three paths of ABDEFJ, ABDEGJ, and ABDEHJ pass the edge AB, so a value of 3/6 may be obtained. From the node A to the node F, there are two paths of ABDEF and ACDEF. The path ABDEF passes through the edge AB, so a value of 1/2 may be obtained. In the same way, from the node A to be node H, a value of 1/2 may be obtained. From the node A to the node G, a value of 1/2 may be obtained. From the node A to the node E, there are two paths of ABDE and ACDE. The path ABDE passes through the edge AB, so a value of 1/2 may be obtained. From the node A to the node D, there are two paths of ABD and ACD. The path ABD passes through the edge AB, so a value of 1/2 may be obtained. From the node A to the node B, there is only one path of AB, so a value of 1 may be obtained. From the node A to the node C, there is only one path of AC without passing through the edge AB, so a value of 0 may be obtained. Therefore, the edge betweenness centrality value of the edge AB may be 1/2+1/2+1/2+1/2+1/2+1/2+1+0=4.

Taking A as the benchmark node, a calculation method of edge betweenness centrality values of other edges may refer to the calculation method of the edge AB. An edge betweenness centrality value of an edge AC may be 4. An edge betweenness centrality value of an edge BD may be 3. An edge betweenness centrality value of an edge CD may be 3. An edge betweenness centrality value of an edge DE may be 5. An edge betweenness centrality value of an edge EF may be 4/3. An edge betweenness centrality value of an edge EH may be 4/3. An edge betweenness centrality value of an edge EG may be 4/3. An edge betweenness centrality value of an edge FJ may be 1/3. An edge betweenness centrality value of an edge HG may be 1/3. An edge betweenness centrality value of an edge GJ may be 1/3. An edge betweenness centrality value of an edge BC may be 0. An edge betweenness centrality value of an edge FH may be 0.

In 530, each node in the regional place map may be designated as a benchmark node in turn, the edge betweenness centrality value of each edge in the regional place map may be calculated by repeating the above operations when each node is designated as a benchmark node.

For example, when the node H is used as the benchmark node, shortest paths from the node H to other nodes may be obtained: HF, HE, HJ, HED, HEG, HJG, HEDB, HEDC, HEDBA, and HEDCA. Edge betweenness centrality values of each edge may be obtained. An edge betweenness centrality value of an edge FH may be 1. An edge betweenness centrality value of an edge EH may be 11/2. An edge betweenness centrality value of an edge HJ may be 3/2. An edge betweenness centrality value of an edge DE may be 4. An edge betweenness centrality value of an edge EG may be 1/2. An edge betweenness centrality value of an edge GJ may be 1/2. An edge betweenness centrality value of an edge BD may be 3/2. An edge betweenness centrality value of an edge CD may be 3/2. An edge betweenness centrality value of an edge AB may be 1/2. An edge betweenness centrality value of an edge AC may be 1/2. An edge betweenness centrality value of an edge BC may be 0. An edge betweenness centrality value of an edge EF may be 0. An edge betweenness centrality value of an edge FJ may be 0.

For calculation when other nodes are used as benchmark nodes, please refer to the above calculation descriptions.

In 540, n edge betweenness centrality values of each edge in the regional place map obtained based on the operations may be obtained.

For example, after the edge betweenness centrality value is calculated for each edge by sequentially taking the node A to the node J in FIG. 4 as benchmark nodes, 9 edge betweenness centrality values may be obtained for each edge.

In some embodiments, as shown in FIG. 6, results obtained from the above calculation may be made into a Table 600 to obtain the edge betweenness centrality value corresponding to each edge when each node as the benchmark node.

In 550, a total value of edge betweenness centrality of each edge may be obtained by summing the n edge betweenness centrality values of each edge.

The total value of edge betweenness centrality may be a sum of the edge betweenness centrality values.

In some embodiments, the total value of edge betweenness centrality may be obtained by directly adding each edge betweenness centrality value. For example, as shown in FIG. 6, the total value of the edge betweenness centrality of the edge AB may be a sum of 9 edge betweenness centrality values of the edge AB. In the same way, the total value of edge betweenness centrality of each other edge may be calculated respectively.

In some embodiments, the total value of edge betweenness centrality may be obtained by weighed sum of each edge betweenness centrality value.

In some embodiments, the object platform may determine a second weight of each edge betweenness centrality value among n edge betweenness centrality values of each edge in combination with a user requirement. Based on the second weight, a weighted sum value of the n edge betweenness centrality values of an edge may be taken as a total value of edge betweenness centrality of the edge.

The second weight may be contribution degree (importance degree) of each edge betweenness centrality value to the total value of edge betweenness centrality. In some embodiments, the second weight may be determined by a user request. For example, when the user request includes a higher degree of attention to real-time pedestrian volume information, the difference in pedestrian volume between two nodes corresponding to each edge may be used as a weight of the edge. The larger the difference is, the smaller the weight corresponding to the edge is.

Applying weights to each edge betweenness centrality value based on the user request may amplify the impact of the user request on the result when the total value of edge betweenness centrality is calculated, so that subsequent division of the regional place map may be more in line with user experience.

In 560, a score value of edge betweenness centrality of each edge may be obtained based on the total value of the edge betweenness centrality of each edge.

The score value of edge betweenness centrality may be a parameter obtained by evaluating the total value of edge betweenness centrality. In some embodiments, the score value of edge betweenness centrality may be a product of the total value of edge betweenness centrality and a score coefficient. The score coefficient may be set by a user or take a default value. For example, the score coefficient may be 0.5. As shown in FIG. 6, if the total value of edge betweenness centrality of an edge AB is 8, the score value of edge betweenness centrality of the edge AB may be 4.

In some embodiments, the recommendation information of the relevant place in the operation 350 may also include a recommendation index. The recommendation index may be determined by processing the current pedestrian volume information of each node and the relationship between each node and the intended place in the target sub-map through a recommendation model to determine the recommendation index.

The recommendation model may be a model that determines a recommendation index. The recommendation model may be a machine learning model. For example, the recommendation model may be a convolutional neural network model.

An input of the recommendation model may include the current pedestrian volume information of each node and the relationship between each node and the intended place. An output of the recommendation model may include a recommendation index of each node.

The relationship between each node and the intended place may be any data related to the intended place. For example, the relationship between each mode and the intended place may be an edge weight of each edge connecting the corresponding node and the node corresponding to the intended place in the target sub-map, a score value of edge betweenness centrality of each edge connecting the corresponding node and the node corresponding to the intended place in the target sub-map, or the like.

The recommendation index may be a parameter that reflects the degree to which the system recommends a certain relevant node. For example, the recommendation index may be a specific value such as 6, 9, etc., or the recommendation index may also be a recommendation level such as relatively recommended, strongly recommended, not recommended, or the like. In some embodiments, the recommendation index may be an integer within 0 to 10.

In some embodiments, the recommendation model may be trained and obtained based on a large number of training samples with labels. In some embodiments, the training sample may be the historical pedestrian volume information of each node and the relationship between each node and the intended place. The labels may be recommendation indexes corresponding to each node. The labels may be obtained by manual annotation.

The recommendation index may be determined by the recommendation model, which can quantify the recommendation degree of the node, reduce the unnecessary cost caused by manual recommendation, and improve the recommendation accuracy.

In 570, the regional place map may be divided based on the score value of edge betweenness centrality score of each edge.

In some embodiments, the division process may be performed based on the score value of edge betweenness centrality. For example, an edge with a highest score value of edge betweenness centrality may be used as a segmenting edge, and the regional place map including the two nodes corresponding to the edge may be divided into two sub-maps. For example, based on the aforementioned calculation, score values of the edge betweenness centrality of each edge in FIG. 4 may be as follows. A score value of edge betweenness centrality of an edge FH may be 1. A score value of edge betweenness centrality of an edge EH may be 34/6. A score value of edge betweenness centrality of an edge HJ may be 19/6. A score value of edge betweenness centrality of an edge DE may be 20. A score value of edge betweenness centrality of an edge EG may be 14/3. A score value of edge betweenness centrality of an edge GJ may be 11/3. A score value of edge betweenness centrality of an edge BD may be 9. A score value of edge betweenness centrality of an edge CD may be 9. A score value of edge betweenness centrality of an edge AB may be 4. A score value of edge betweenness centrality of an edge AC may be 4. A score value of edge betweenness centrality of an edge BC may be 1. A score value of edge betweenness centrality of an edge EF may be 34/6. A score value of edge betweenness centrality of an edge FJ may be 19/6. In the regional place map 420, the score value of the betweenness centrality score of the edge DE is the largest, that is, the edge DE may be used as a segmentation edge to divide the regional place map 420, and a sub-map 421 and a sub-map 425 may be obtained.

In some embodiments, an edge whose score value of edge betweenness centrality exceeds a threshold of score value may be used as a segmentation edge to divide the regional place map including the two nodes corresponding to each edge may be divided respectively to obtain a plurality sub-maps. The threshold of score value may be determined based on a user setting.

In some embodiments, the target sub-map may be further divided according to the foregoing method based on the division result of the operations to obtain a better division result, and based on the final division result, places corresponding to other nodes in a same sub-map as the target node may be designated as recommended places.

In some embodiments, the aforementioned division operations may be continuously repeated until each sub-map includes only one node. If one division corresponds to one stage, and after an original map is divided y times, each sub-map includes only one node, then the entire division process may have y stages, and the modularity (represented by a letter Q in the equation) value corresponding to each stage may be calculated. The division result corresponding to the stage with a largest modularity value (Q value) may be taken as the optimal division result, and the sub-map obtained corresponding to the division result, and other nodes located in the same sub-map as the target node may be designated as recommended places.

The modularity value may be understood as a difference between a network and a random network under a certain clustering division. Because the random network may not have a sub-map structure, the larger the difference corresponding to a certain clustering division is, the better the sub-map division result is. The modularity value (Q value) may be obtained based on the following equation (3):

$$Q = \frac{1}{2m} \sum_{vw} \left[ A_{vw} - \frac{k_v k_w}{2m} \right] \delta(c_v, c_w), \qquad (3)$$

where m denotes a count of edges in the original map, v and w denote any two nodes in the map, $A_{vw}$ denotes whether there is an edge between the two nodes (if there is an edge, the value is 1, otherwise the value is 0), $k_v$ and $k_w$ denote degrees of the node V and the node W, $(c_v, c_w)$ denotes whether the two node are in a same sub-map (if the two nodes are in the same sub-map, the value is 1, otherwise the value is 0). In some embodiments, a theoretical size range of the Q value is [−0.5, 1).

Through the preset algorithm described in the some embodiments of the present disclosure, a sub-map with a higher degree of association may be obtained. When a user initiates a query request, the result may be directly queried in a sub-map with a higher degree of association, which avoids the huge amount of calculation caused by querying the entire regional place map and improves the query efficiency.

Figure 7:
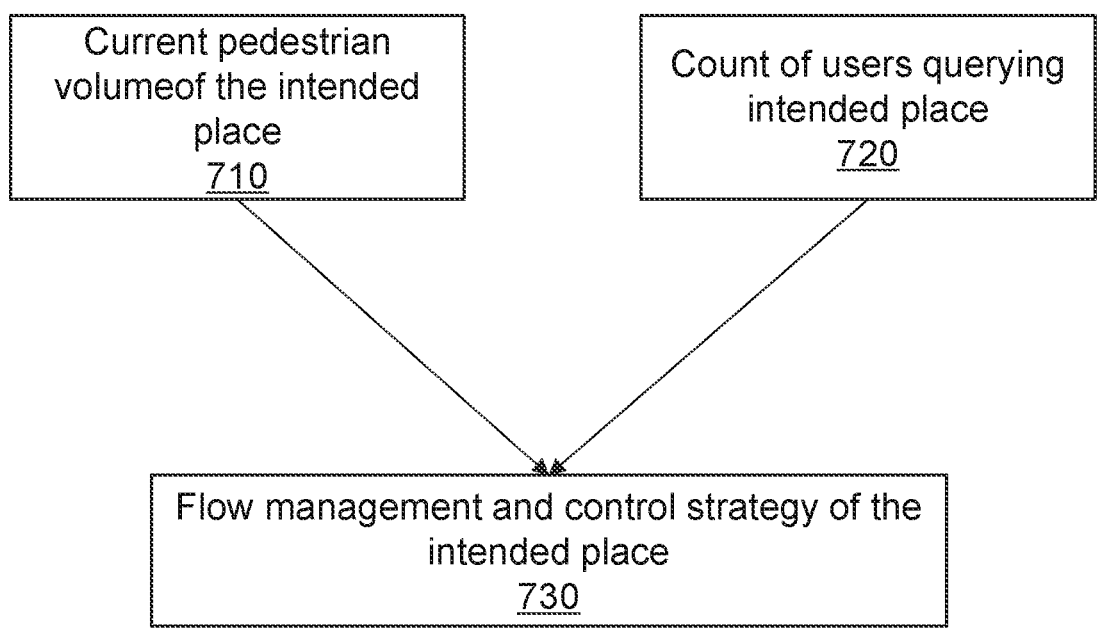
FIG. 7 is a schematic diagram illustrating an exemplary process for determining a management and control strategy of an intended place according to some embodiments of the present disclosure.

FIG. 7 is a schematic diagram illustrating an exemplary process for determining a management and control strategy of an intended place according to some embodiments of the present disclosure. In some embodiments, the process 700 may be performed by an object platform.

In some embodiments, the object platform may determine a flow management and control strategy of the intended place 730 based on a current pedestrian volume of the intended place 710 and a count of users querying the intended place 720.

The count of users querying the intended place 720 may be a count of users who issue a query request within a certain time period. In some embodiments, the count of users who query within a certain time period may be less than or equal to a count of query requests. For example, a same user may issue a plurality of query requests within the time period. By determining the count of users who query, the count of users may be used as a basis for a current or future pedestrian volume of the intended place.

The flow management and control strategy may be a solution to manage the pedestrian volume. For example, when the pedestrian volume in a certain place exceeds a threshold of pedestrian volume, the flow management and control strategy may include a measure such as limiting pedestrian volume in the place, diverting pedestrian volume to a relevant place, increasing management and control personnel and resources, etc. When the pedestrian volume in a certain place is less than a threshold of pedestrian volume, the flow management and control strategy may include a measure such as fully opening the place, reducing management and control personnel and resources, etc.

In some embodiments, the flow management and control strategy may be determined based on a preset threshold of pedestrian volume. For example, when a sum of the current pedestrian volume and the count of users who query is greater than the preset threshold of pedestrian volume, the flow management and control strategy may include a measure such as flow limiting and flow diverting, etc. When a sum of the current pedestrian volume and the count of users who query is less than the preset threshold of pedestrian volume, the flow management and control strategy may include a measure such as opening, etc.

In some embodiments, it may be determined whether to divert the flow to other places based on edge weights of edges between places corresponding to other nodes and the intended place in the sub-map. For example, when there is no relevant place in the target sub-map corresponding to the intended place, no flow diverting may be performed. When there is at least one relevant place in the target sub-map corresponding to the intended place, the pedestrian volume may be diverted to the relevant place. The way to diverting the pedestrian volume may be that the pedestrian volume is diverted to a plurality of relevant places at the same time, or is preferentially diverted to a relevance place corresponding to a node connected by an edge with a low edge weight. The way to diverting the pedestrian volume may be to send recommendation information of the place corresponding to the node whose edge weight between the other node and the intended place is smaller than a preset threshold to a user terminal corresponding to a user who initiates a query.

Through the above process of diverting the pedestrian volume, local management and control of the pedestrian volume can be realized, and on the premise of meeting the requests of users, unnecessary dangers caused by the accumulation of pedestrian volume can be avoided.

In some embodiments, the method for counting and regulating pedestrian volume in a public place may further include determining whether to control the flow of the intended place currently based on predicted flow of the intended place at a future time. For example, when the predicted flow at the future time is greater than a preset threshold, the flow control may be performed on the intended place.

The flow at the future time may be the pedestrian volume in the intended place at a future time. In some embodiments, the flow at the future time may be determined based on popularity of intended place. For detailed description regarding the flow management and control for the intended place at a future time, please refer to the determination and implementation of the above-mentioned flow management and control strategy.

In some embodiments, the object platform may determine the popularity of the intended place based on the count of users who query the intended place.

The popularity may be a preference of the user for the intended place. The popularity may be determined in a plurality of ways. For example, the popularity may be determined based on a count of the place that is regarded as an intended place in the query requests of users. The popularity may be determined based on user reviews of the place, such as a count of online positive reviews. The popularity may be determined based on real-time pedestrian volume information, or the like. In some embodiments, the popularity may be represented by a specific value, for example, the popularity may be a value from 1 to 5, the larger the value is, the more popular the intended place may be.

In some embodiments, the object platform may adjust the current real-time flow of the intended place based on popularity to determine a flow at the future time.

The flow at the future time may be calculated through the following equation (4):

$$L_W = L_D + kH \quad (4),$$

where $L_W$ denotes flow at the future time, $L_D$ denotes current real-time flow, k denotes a constant (which may be any value from 60% to 100%), and H denotes a value of popularity.

In some embodiments, an adjustment factor may be determined based on a confidence level of the recommendation model, and the flow at the future time may be adjusted through the adjustment factor to obtain the adjusted flow at the future time.

The recommendation model may also include a confidence level. The confidence level may be a parameter reflecting the confidence degree of a recommendation index output by the recommendation model. In some embodiments, the confidence level may be represented as a percentage from 0 to 100%. The higher the confidence level is, the higher the confidence degree of the recommendation index output by the recommendation model is.

The adjustment factor may be a parameter for correcting flow at a future time. In some embodiments, the adjustment factor may be calculated through the following equation (5):

$$y = (n/10) \times Z \times 100\% \quad (5),$$

where y denotes an adjustment factor, n denotes a recommendation index output by a recommendation model, and Z denotes a confidence level of the recommendation model.

The adjusted flow at the future time may be obtained through the following equation (6):

$$L = L_W \times y \quad (6),$$

where L denotes the adjusted flow at the future time. By correcting the flow at the future time through the adjustment factor, a prediction result that is more in line with the actual situation may be obtained.

The flow management and control strategy of the intended place may be determined by the method described in some embodiments of the present disclosure. The flow management and control strategy may be adjusted according to the change of the pedestrian volume, so as to meet the real-time management and control requirements of the dynamic change of the pedestrian volume. In addition, the future pedestrian volume may be predicted through popularity, so that future management and control can be planned in advance to improve current and future travel experience of users.

Some embodiments of the present disclosure also disclose a computer-readable storage medium storing computer instructions. The computer instructions may be executed by a processor to perform the method for counting and regulating pedestrian volume in a public place.

Having thus described the basic concepts, it may be rather apparent to those skilled in the art after reading this detailed disclosure that the foregoing detailed disclosure is intended to be presented by way of example only and is not limiting.

Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for counting and regulating pedestrian volume in a public place of a smart city, which is realized based on an Internet of Things system for counting and regulating the pedestrian volume, wherein the Internet of Things system for counting and regulating the pedestrian volume comprises a user platform, a service platform, a management platform, a sensor network platform, and an object platform, and the method comprises:
   receiving, based on the user platform, a query request for an intended place initiated by a user;
   transmitting, based on the service platform, the query request to the management platform, and generating, based on the management platform, a query instruction, wherein the query instruction includes a regional location of the intended place;
   issuing, based on the management platform, the query instruction to a sensor network sub-platform of the sensor network platform corresponding to the management platform according to the regional location, wherein the sensor network platform performs data storage, data processing, and/or data transmission for data of different object platforms by using different sensor network sub-platforms, and the different sensor network sub-platforms correspond to different regional locations;
   sending, based on the sensor network sub-platform, the query instruction to the object platform corresponding to the sensor network sub-platform;
   obtaining, based on the object platform, a query result according to the query instruction, wherein the query result includes current information of the intended place and recommendation information of a relevant place; and
   feeding back, based on the object platform, the query result to the user platform through the sensor network sub-platform, the management platform, and the service platform corresponding to the object platform respectively, wherein
   the obtaining, based on the object platform, a query result according to the query instruction includes:
      obtaining information of the intended place and the relevant place in a regional place map and generating the query result based on the object platform according to the query request, wherein different nodes in the regional place map represent different places, attributes of the nodes in the regional place map include place real-time information and place basic information, the place real-time information includes at least one of a current pedestrian volume, or current management and control information, and the place basic information includes at least one of a place type, or a place location; and an edge in the regional place map is configured to connect two nodes, a mutual relationship of which meets a preset condition, the preset condition is that a place type difference of places corresponding to two connected nodes is smaller than a preset difference value, or a spatial distance of the places corresponding to the two connected nodes is less than a distance threshold, wherein determining the relevant place includes:

dividing, based on a preset algorithm, the regional place map into several sub-maps, wherein the preset algorithm includes:

designating n nodes as benchmark nodes respectively and determining n edge betweenness centrality values of each edge of all the edges;

for each node of the n nodes, designating the node as the benchmark node and determining a shortest path from the benchmark node to other nodes; and calculating the edge betweenness centrality values of all the edges in the regional place map based on the shortest path;

obtaining a total value of edge betweenness centrality of each edge by summing the n edge betweenness centrality values of each edge, wherein the total value of edge betweenness centrality is obtained by weighed sum of the n edge betweenness centrality values, and determining a second weight used for the weighted sum based on a user request includes:

determining a difference in pedestrian volume between two nodes corresponding to each edge as the second weight, the difference being negatively correlated with the second weight;

obtaining a score value of edge betweenness centrality of each edge based on the total value of the edge betweenness centrality of each edge; and dividing the regional place map based on the score value of edge betweenness centrality score of each edge;

determining, based on the query request, a target sub-map from the several sub-maps; and determining, based on the target sub-map, a recommendation node, and determining a place corresponding to the recommendation node as the relevant place, wherein the recommendation information of the relevant place includes a recommendation index of the relevant place, and determining the recommendation index of the relevant place includes:

determining the recommendation index by processing the current pedestrian volume information of each node and a relationship between each node and the intended place in the target sub-map based on a recommendation model, wherein for each node, the relationship between each node and the intended place includes: an edge weight and the score value of edge betweenness centrality of each edge connecting the corresponding node and the node corresponding to the intended place in the target sub-map.

2. The method of claim 1, wherein the determining the management and control strategy for the intended place includes:

determining, based on a current flow of the intended place and a count of users querying, a flow management and control strategy of the intended place; and predicting a flow of the intended place at a future time, and performing flow management and control in the intended place when the flow of the intended place at the future time is greater than a preset threshold.

3. The method of claim 2, wherein the predicting a flow of the intended place at a future time includes:

determining, based on the count of users querying the intended place, popularity of the intended place; and adjusting, based on the popularity, the current flow of the intended place to determine the flow of the intended place at the future time.

4. An Internet of Things system for counting and regulating pedestrian volume in a public place of a smart city, comprising a user platform, a service platform, a management platform, a sensor network platform, and an object platform, wherein the user platform is configured to receive a query request for an intended place initiated by a user;

the service platform is configured to transmit the query request to the management platform, and the management platform is configured to generate a query instruction, wherein the query instruction includes a regional location of the intended place;

the management platform is further configured to issue the query instruction to a sensor network sub-platform of the sensor network platform corresponding to the management platform according to the regional location;

the sensor network platform is configured to send the query instruction to the object platform corresponding to the sensor network platform, wherein the sensor network platform performs data storage, data processing, and/or data transmission for data of different object platforms by using different sensor network sub-platforms, and the different sensor network sub-platforms correspond to different regional locations; and the object platform is configured to obtain a query result according to the query instruction, and feed back the query result to the user platform through the sensor network sub-platform, the management platform, and the service platform corresponding to the object platform respectively, wherein the query result includes current information of the intended place and recommendation information of a relevant place;

to obtain the query instruction, the object platform is further configured to: obtain information of the intended place and the relevant place in a regional place map, and generate the query result according to the query request, wherein different nodes in the regional place map represent different places, attributes of the nodes in the regional place map include place real-time information and place basic information, the place real-time information includes at least one of a current pedestrian volume, or current management and control information, and the place basic information includes at least one of a place type, or a place location; and an edge in the regional place map is configured to connect two nodes, a mutual relationship of which meets a preset condition, the preset condition is that a place type difference of places corresponding to two connected nodes is smaller than a preset difference value, or a spatial distance of the places corresponding to the two connected nodes is less than a distance threshold;

to obtain the query instruction, the object platform is further configured to:
  divide, based on a preset algorithm, the regional place map into several sub-maps, wherein the preset algorithm includes:
    designating n nodes as benchmark nodes respectively and determining n edge betweenness centrality values of each edge of all the edges;
    for each node of the n nodes,
      designating the node as the benchmark node and determining a shortest path from the benchmark node to other nodes; and
      calculating the edge betweenness centrality values of all the edges in the regional place map based on the shortest path:
    obtaining a total value of edge betweenness centrality of each edge by summing the n edge betweenness centrality values of each edge, wherein the total value of edge betweenness centrality is obtained by weighed sum of the n edge betweenness centrality values, and determining a second weight used for the weighted sum based on a user request includes:
      determining a difference in pedestrian volume between two nodes corresponding to each edge as the second weight, the difference being negatively correlated with the second weight:
    obtaining a score value of edge betweenness centrality of each edge based on the total value of the edge betweenness centrality of each edge; and
    dividing the regional place map based on the score value of edge betweenness centrality score of each edge;
  determining, based on the query request, a target sub-map from the several sub-maps; and
  determining, based on the target sub-map, a recommendation node, and determining a place corresponding to the recommendation node as the relevant place, wherein
the recommendation information of the relevant place includes a recommendation index of the relevant place, and determining the recommendation index of the relevant place includes:
  determining the recommendation index by processing the current pedestrian volume information of each node and a relationship between each node and the intended place in the target sub-map based on a recommendation model, wherein for each node, the relationship between each node and the intended place includes: an edge weight and the score value of edge betweenness centrality of each edge connecting the corresponding node and the node corresponding to the intended place in the target sub-map.

5. The system of claim 4, wherein the object platform is further configured to:
  determine, based on a current flow of the intended place and a count of users who query, a flow management and control strategy of the intended place; and
  predict a flow of the intended place at a future time, and performing flow management and control in the intended place when the flow of the intended place at the future time is greater than a preset threshold.

6. The system of claim 5, wherein the object platform is further configured to:
  determine, based on the count of users querying the intended place, popularity of the intended place; and
  adjust, based on the popularity, the current flow of the intended place to determine the flow of the intended place at the future time.

* * * * *